(12) United States Patent
Ekers et al.

(10) Patent No.: US 7,290,146 B2
(45) Date of Patent: Oct. 30, 2007

(54) MANAGED CREDENTIAL ISSUANCE

(75) Inventors: John E. Ekers, Plymouth, MN (US); Gary M. Klinefelter, Eden Prairie, MN (US); David A. Fontanella, Plymouth, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 68 days.

(21) Appl. No.: 11/120,621

(22) Filed: May 3, 2005

(65) Prior Publication Data
US 2005/0257253 A1 Nov. 17, 2005

Related U.S. Application Data

(60) Provisional application No. 60/567,734, filed on May 3, 2004.

(51) Int. Cl.
*H04L 9/00* (2006.01)
(52) U.S. Cl. .......................................... 713/182; 726/5
(58) Field of Classification Search ................ 713/182; 726/5
See application file for complete search history.

(56) References Cited

U.S. PATENT DOCUMENTS

| | | | |
|---|---|---|---|
| 3,193,430 A | 7/1965 | Messmer et al. | 156/355 |
| 3,446,415 A | 5/1969 | Bromley | 229/30 |
| 3,761,079 A | 9/1973 | Azure, Jr. | 271/41 |
| 3,887,106 A | 6/1975 | Charlson et al. | 221/197 |
| 3,889,472 A | 6/1975 | Guillaud | 60/698 |
| 3,960,072 A | 6/1976 | Ahlgren et al. | 101/35 |
| 4,021,032 A | 5/1977 | Gross et al. | 271/166 |
| 4,068,028 A | 1/1978 | Samonides | 428/40 |
| 4,146,900 A | 3/1979 | Arnold | 346/75 |
| 4,179,732 A | 12/1979 | Khan et al. | 364/200 |
| 4,282,583 A | 8/1981 | Khan et al. | 364/900 |
| 4,313,683 A | 2/1982 | Brown et al. | 400/225 |
| 4,393,386 A | 7/1983 | De Giulio | 346/75 |
| 4,471,885 A | 9/1984 | Mucciarone | 221/155 |
| 4,534,313 A | 8/1985 | Louvel | 118/696 |

(Continued)

FOREIGN PATENT DOCUMENTS

EP 0 278 517 A2 8/1988

(Continued)

OTHER PUBLICATIONS

Office Communication for U.S. Appl. No. 10/372,011, filed Feb. 21, 2003. Date of mailing: Apr. 18, 2006.

(Continued)

*Primary Examiner*—Nasser Moazzami
*Assistant Examiner*—David Garcia Cervetti
(74) *Attorney, Agent, or Firm*—Westman, Champlin & Kelly, P.A.

(57) ABSTRACT

In a method of issuing a credential, a request for issuance of the credential is received. Next, a unique identification for the requested credential is assigned and data elements corresponding to the credential are provided. A credential production data collection is built in accordance with a credential production template. The credential production data collection includes the unique identification and production job data. Production commands are then provided to a credential production device based on the credential production data collection and the credential is produced using the credential production device in response to the production commands.

16 Claims, 2 Drawing Sheets

U.S. PATENT DOCUMENTS

| | | | |
|---|---|---|---|
| 4,604,631 A | 8/1986 | Jinnai et al. ............... 346/1.1 |
| 4,617,080 A | 10/1986 | Kobayashi et al. ......... 156/359 |
| 4,680,596 A | 7/1987 | Logan ....................... 346/140 |
| 4,685,702 A | 8/1987 | Kazuharu .................. 283/81 |
| 4,686,540 A | 8/1987 | Leslie et al. ................. 346/33 |
| 4,716,346 A | 12/1987 | Matsuo ....................... 318/38 |
| 4,719,626 A | 1/1988 | Ogasawara .................. 371/16 |
| 4,734,868 A | 3/1988 | DeLacy ..................... 364/519 |
| 4,750,743 A | 6/1988 | Nicoletti .................... 273/148 |
| 4,781,985 A | 11/1988 | Desjarlais .................. 428/421 |
| 4,827,425 A * | 5/1989 | Linden ..................... 700/225 |
| 4,864,618 A | 9/1989 | Wright et al. ................ 380/51 |
| 4,938,830 A | 7/1990 | Cannistra .................. 156/270 |
| 4,961,088 A | 10/1990 | Gilliland et al. ............ 355/206 |
| 5,018,614 A | 5/1991 | Ruckert ..................... 194/236 |
| 5,025,399 A * | 6/1991 | Wendt et al. ............. 358/1.18 |
| 5,027,135 A | 6/1991 | Negishi et al. ............. 346/154 |
| 5,161,233 A | 11/1992 | Matsuo et al. ............. 355/218 |
| 5,184,181 A | 2/1993 | Kurando et al. ............ 355/260 |
| 5,238,524 A | 8/1993 | Seki et al. .................. 156/538 |
| 5,266,968 A | 11/1993 | Stephenson ................. 346/76 |
| 5,267,800 A | 12/1993 | Petteruti et al. ............. 400/88 |
| 5,277,501 A | 1/1994 | Tanaka et al. ............. 400/120 |
| 5,290,067 A | 3/1994 | Langen ..................... 283/60.1 |
| 5,318,369 A | 6/1994 | Ishii ......................... 400/249 |
| 5,318,370 A | 6/1994 | Nehowig .................... 400/613 |
| 5,326,179 A | 7/1994 | Fukai et al. ................ 400/120 |
| 5,327,201 A | 7/1994 | Coleman et al. ........... 355/278 |
| 5,368,677 A | 11/1994 | Ueda et al. ................. 156/362 |
| 5,373,146 A | 12/1994 | Lei .......................... 235/382.5 |
| 5,378,884 A | 1/1995 | Lundstrom et al. ......... 235/441 |
| 5,410,642 A | 4/1995 | Hakamatsuka et al. ..... 395/113 |
| 5,412,779 A | 5/1995 | Motoyama ................. 395/275 |
| 5,413,532 A | 5/1995 | Raby .............................. 462/2 |
| 5,437,960 A | 8/1995 | Nagate et al. .............. 430/256 |
| 5,441,921 A | 8/1995 | Verdonck et al. .......... 503/227 |
| 5,455,611 A | 10/1995 | Simon et al. ................. 347/49 |
| 5,466,319 A | 11/1995 | Zager et al. ................ 156/220 |
| 5,484,502 A | 1/1996 | Bozanic ..................... 156/235 |
| 5,516,218 A | 5/1996 | Amano et al. .............. 400/535 |
| 5,534,857 A * | 7/1996 | Laing et al. ............... 340/5.74 |
| 5,537,554 A | 7/1996 | Motoyama ................. 395/280 |
| 5,544,289 A | 8/1996 | Motoyama ................. 395/280 |
| 5,550,735 A | 8/1996 | Slade et al. ................. 364/401 |
| 5,550,984 A | 8/1996 | Gelb ....................... 395/200.17 |
| 5,552,994 A | 9/1996 | Cannon et al. ........ 364/468.01 |
| 5,558,449 A | 9/1996 | Morgavi ..................... 400/188 |
| 5,568,618 A | 10/1996 | Motoyama ................. 395/280 |
| 5,573,621 A | 11/1996 | Boreali ...................... 156/256 |
| 5,617,528 A * | 4/1997 | Stechmann et al. ......... 715/517 |
| 5,630,581 A | 5/1997 | Rodesch ....................... 271/23 |
| 5,637,174 A | 6/1997 | Field et al. ................. 156/256 |
| 5,646,388 A | 7/1997 | D'Entremont et al. ...... 235/380 |
| 5,649,120 A | 7/1997 | Motoyama ................. 395/280 |
| 5,673,076 A | 9/1997 | Nardone et al. ............ 347/171 |
| 5,695,589 A | 12/1997 | German et al. ............. 156/250 |
| 5,709,484 A | 1/1998 | Dorner ...................... 400/188 |
| 5,709,485 A | 1/1998 | Kohno ....................... 400/208 |
| 5,715,381 A | 2/1998 | Hamilton ................... 395/114 |
| 5,717,776 A | 2/1998 | Watanabe ................... 382/116 |
| 5,727,137 A | 3/1998 | LeClair et al. ............. 375/116 |
| 5,745,036 A | 4/1998 | Clare ......................... 340/572 |
| 5,758,184 A | 5/1998 | Lucovsky et al. .......... 395/826 |
| 5,768,143 A | 6/1998 | Fujimoto ................... 364/479 |
| 5,768,483 A | 6/1998 | Maniwa et al. ............. 395/114 |
| 5,768,495 A | 6/1998 | Campbell et al. ...... 395/183.01 |
| 5,771,058 A | 6/1998 | Kobayashi ................. 347/218 |
| 5,771,071 A | 6/1998 | Bradley et al. ............. 348/335 |
| 5,771,382 A | 6/1998 | Wang et al. ................ 395/670 |
| 5,774,678 A | 6/1998 | Motoyama ................. 395/280 |
| 5,783,024 A | 7/1998 | Forkert ...................... 156/351 |
| 5,785,224 A | 7/1998 | Nawakowski .................. 225/4 |
| 5,790,162 A | 8/1998 | Adams et al. .............. 347/222 |
| 5,796,420 A | 8/1998 | Kaerts et al. ............... 347/188 |
| 5,805,810 A | 9/1998 | Maxwell ................ 395/200.36 |
| 5,807,461 A | 9/1998 | Hagstrom ................... 156/361 |
| 5,819,110 A | 10/1998 | Motoyama ................. 395/835 |
| 5,822,534 A | 10/1998 | Yamunachari et al. . 395/200.54 |
| 5,828,567 A | 10/1998 | Eryurek et al. ............. 364/184 |
| 5,835,911 A | 11/1998 | Nakagawa et al. ......... 707/203 |
| 5,837,991 A | 11/1998 | LaManna et al. ........... 235/475 |
| 5,860,068 A | 1/1999 | Cook ........................... 705/26 |
| 5,862,260 A | 1/1999 | Rhoads ...................... 382/232 |
| 5,873,606 A | 2/1999 | Haas et al. ................... 283/75 |
| 5,874,145 A | 2/1999 | Waller ...................... 428/42.1 |
| 5,884,014 A | 3/1999 | Huttenlocher et al. ...... 395/114 |
| 5,886,334 A | 3/1999 | D'Entremont et al. ...... 235/380 |
| 5,887,216 A | 3/1999 | Motoyama ..................... 399/8 |
| 5,889,866 A | 3/1999 | Cyras et al. .................. 380/49 |
| 5,889,941 A * | 3/1999 | Tushie et al. ................. 726/26 |
| 5,936,542 A | 8/1999 | Kleinrock et al. ...... 340/825.34 |
| 5,941,414 A | 8/1999 | Kasper ....................... 221/210 |
| 5,941,522 A | 8/1999 | Hagstrom et al. .......... 271/225 |
| 5,962,832 A | 10/1999 | Dorner ....................... 235/380 |
| 5,973,692 A | 10/1999 | Knowlton et al. .......... 345/348 |
| 5,980,011 A | 11/1999 | Cummins et al. ............. 347/4 |
| 6,014,748 A * | 1/2000 | Tushie et al. ................. 726/9 |
| 6,022,429 A | 2/2000 | Hagstrom .................... 156/64 |
| 6,033,832 A | 3/2000 | Wingender ................. 430/373 |
| 6,070,146 A | 5/2000 | Mimata ........................ 705/13 |
| 6,100,804 A | 8/2000 | Brady et al. .............. 340/572.7 |
| 6,182,136 B1 | 1/2001 | Ramanathan et al. ....... 709/224 |
| 6,189,103 B1 | 2/2001 | Nevarez et al. ............. 713/201 |
| 6,196,459 B1 * | 3/2001 | Goman et al. .............. 235/380 |
| 6,199,753 B1 | 3/2001 | Tracy et al. ................. 235/375 |
| 6,219,669 B1 | 4/2001 | Haff et al. |
| 6,220,511 B1 * | 4/2001 | Holec et al. ................ 235/380 |
| 6,233,683 B1 | 5/2001 | Chan et al. ................. 713/172 |
| 6,272,472 B1 | 8/2001 | Danneels et al. ............. 705/27 |
| 6,292,092 B1 | 9/2001 | Chow et al. ................. 340/5.6 |
| 6,298,336 B1 | 10/2001 | Davis et al. .................. 705/41 |
| 6,335,799 B1 | 1/2002 | Provost ...................... 358/1.4 |
| 6,367,011 B1 * | 4/2002 | Lee et al. ................... 713/172 |
| 6,380,965 B1 | 4/2002 | Sims et al. .................. 347/218 |
| 6,386,772 B1 | 5/2002 | Klinefelter et al. ......... 400/208 |
| 6,412,991 B1 | 7/2002 | Klinefelter et al. ......... 400/240 |
| 6,554,512 B2 | 4/2003 | Heno et al. ................. 400/625 |
| 6,582,141 B2 | 6/2003 | Meier et al. ................ 400/701 |
| 6,584,564 B2 | 6/2003 | Olkin et al. ................ 713/152 |
| 6,631,967 B1 | 10/2003 | Saruta .......................... 347/19 |
| 6,632,250 B1 * | 10/2003 | Lynch et al. ................ 715/517 |
| 6,633,405 B1 | 10/2003 | Nguyen ..................... 358/1.16 |
| 6,644,771 B1 | 11/2003 | Silverbrook ................. 347/19 |
| 6,647,871 B2 | 11/2003 | Morand ........................ 101/33 |
| 6,662,999 B1 * | 12/2003 | Vancour et al. ............. 235/375 |
| 6,663,100 B2 | 12/2003 | Crowley ..................... 271/165 |
| 6,668,322 B1 | 12/2003 | Wood et al. ................ 713/182 |
| 6,694,884 B2 | 2/2004 | Klinefelter et al. ......... 101/484 |
| 6,695,205 B1 * | 2/2004 | Lundstrom et al. ......... 235/380 |
| 6,711,678 B2 | 3/2004 | Ferguson .................... 713/153 |
| 6,732,101 B1 | 5/2004 | Cook ........................... 707/10 |
| 6,732,148 B1 | 5/2004 | Estrada et al. .............. 709/205 |
| 6,738,903 B1 | 5/2004 | Haines ....................... 713/168 |
| 6,758,616 B2 | 7/2004 | Pribula et al. .............. 400/624 |
| 6,783,067 B2 * | 8/2004 | Kreuter et al. .............. 235/381 |
| 6,788,800 B1 | 9/2004 | Carr et al. .................. 382/100 |
| 6,792,544 B2 | 9/2004 | Hashem et al. ............. 713/201 |
| 6,816,968 B1 | 11/2004 | Walmsley .................. 713/168 |
| 6,826,609 B1 | 11/2004 | Smith et al. ................ 709/225 |
| 6,830,803 B2 * | 12/2004 | Vaidya et al. ............. 428/195.1 |
| 6,850,900 B1 | 2/2005 | Hare et al. .................... 705/26 |
| 6,850,911 B1 | 2/2005 | Huether ....................... 705/51 |
| 6,856,975 B2 | 2/2005 | Inglis ............................ 705/51 |
| 6,902,107 B2 * | 6/2005 | Shay et al. .................. 235/381 |

| | | | |
|---|---|---|---|
| 6,929,413 B2 | 8/2005 | Schofield | 400/103 |
| 6,932,527 B2 | 8/2005 | Pribula et al. | 400/621 |
| 7,013,365 B2 * | 3/2006 | Arnouse | 711/115 |
| 2001/0008253 A1 * | 7/2001 | Holec et al. | 235/381 |
| 2001/0053947 A1 | 12/2001 | Lenz et al. | 700/117 |
| 2002/0051167 A1 | 5/2002 | Francis et al. | 385/1.14 |
| 2002/0072998 A1 | 6/2002 | Haines et al. | 705/28 |
| 2002/0107799 A1 * | 8/2002 | Hoshino et al. | 705/41 |
| 2002/0118243 A1 | 8/2002 | Forman | 347/19 |
| 2002/0171728 A1 | 11/2002 | Pribula et al. | 347/104 |
| 2002/0180993 A1 | 12/2002 | Klinefelter et al. | 358/1.1 |
| 2003/0001941 A1 * | 1/2003 | Pearson et al. | 347/208 |
| 2003/0023703 A1 | 1/2003 | Hayward et al. | 709/217 |
| 2003/0028766 A1 | 2/2003 | Gass et al. | 713/164 |
| 2003/0059050 A1 | 3/2003 | Hohberger et al. | 380/270 |
| 2003/0139973 A1 | 7/2003 | Claremont et al. | 705/26 |
| 2003/0152409 A1 | 8/2003 | Pribula et al. | 400/718 |
| 2003/0164982 A1 | 9/2003 | Lien | 358/1.18 |
| 2003/0182587 A1 | 9/2003 | Morrison et al. | 713/202 |
| 2003/0216826 A1 | 11/2003 | Klinefelter et al. | 700/95 |
| 2004/0022572 A1 | 2/2004 | Bungert et al. | 400/248 |
| 2004/0109715 A1 | 6/2004 | Meier et al. | 400/191 |
| 2005/0006460 A1 * | 1/2005 | Kreuter | 235/380 |
| 2005/0060239 A1 | 3/2005 | Holland et al. | 705/26 |

FOREIGN PATENT DOCUMENTS

| | | |
|---|---|---|
| EP | 0 562 979 A2 | 9/1993 |
| EP | 0 659 588 A2 | 6/1995 |
| EP | 0 887 197 A2 | 12/1998 |
| EP | 0 924 597 A2 | 6/1999 |
| EP | 1488303 B1 | 3/2003 |
| GB | 2 120 821 A | 12/1983 |
| JP | 8-187921 A | 7/1996 |
| JP | 2001-24838 | 1/2001 |
| JP | 2001-215231 | 8/2001 |
| WO | WO 86/07480 | 12/1986 |
| WO | WO 95/09084 | 4/1995 |
| WO | WO 96/39656 | 12/1996 |
| WO | WO 98/52762 | 11/1998 |
| WO | WO 98/51508 | 12/1998 |
| WO | WO 99/21713 | 5/1999 |
| WO | WO 99/49379 | 9/1999 |
| WO | WO 00/43932 | 7/2000 |
| WO | WO 03/059632 A1 | 12/2002 |
| WO | WO 03/060811 A2 | 12/2002 |
| WO | WO 03/079168 A3 | 3/2003 |
| WO | WO 03/079168 A2 | 9/2003 |
| WO | WO 2004/011268 A1 | 2/2004 |
| WO | WO 2004/027715 | 4/2004 |

OTHER PUBLICATIONS

Office Communication for U.S. Appl. No. 10/372,011, filed Feb. 21, 2003. Date of mailing: Oct. 18, 2005.

OrdaCard announces new Internet based high volume secured photo ID card production services, Oct. 1998, Business Wire, Inc.

DataCard Debuts Image and Data Retrieval Software for Enterprise Applications, Apr. 1998, Business Wire, Inc.

www.SmartIDCard.com, Jul. 2002 4 pages, "Card Printing Service".

UbiQ Smart Card Software Makes New FARGO Printers Complete Card-Issuance Systems Issuers Can Print and Personalize Smart Cards Using Pro Series ID Card Printers Combined with Ubiq's Personalization Software, Apr. 1998.

Anon, "Instantly Re-Order Toner Cartridges Online Using HP's Smartchip," M2 Presswire, Oct. 19, 2001, 2 pages.

International Search Report for International Application No. PCT/US 03/06187, filed Feb. 28, 2003. Search Report dated of Jul. 18, 2003.

U.S. Appl. No. 11/232,427, filed Sep. 21, 2005.

International Search Report and Written Opinion for International Application No. PCT/US05/15176, filed May 3, 2005. Mailing date of Nov. 30, 2006.

* cited by examiner

MANAGED CREDENTIAL ISSUANCE

The present application is based on and claims the benefit of U.S. provisional patent application Ser. No. 60/567,734, filed May 3, 2004, the content of which is hereby incorporated by reference in its entirety.

BACKGROUND OF THE INVENTION

Credentials include identification cards, driver's licenses, passports, and other documents. Such credentials generally include printed information, such as a photo, account numbers, identification numbers, and other personal information. Additionally, credentials can include data that is encoded in a smartcard chip, a magnetic stripe, or a barcode, for example. Smartcard chips can include a microprocessor for executing applications stored in the memory of the smartcard chip. Such applications can be used to manage account information, audit use of the credential, perform security checks, and perform other tasks. Accordingly, the production and issuance of such credentials often requires the integration of several credential production applications and credential production devices, such as a printer and data encoder.

As a result, the management of the production of a credential can be very complicated. This complexity is increased as a result of a need to make the process highly secure.

SUMMARY OF THE INVENTION

The present invention generally relates to a method of issuing a credential. In the method, a request for issuance of the credential is received. Next, a unique identification for the requested credential is assigned and data elements corresponding to the credential are provided. A credential production data collection is built in accordance with a credential production template. The credential production data collection includes the unique identification and production job data. Production commands are then provided to a credential production device based on the credential production data collection and the credential is produced using the credential production device in response to the production commands.

Other features and benefits that characterize embodiments of the present invention will be apparent upon reading the following detailed description and review of the associated drawings.

DETAILED DESCRIPTION OF THE PREFERRED EMBODIMENTS

Figure 1:
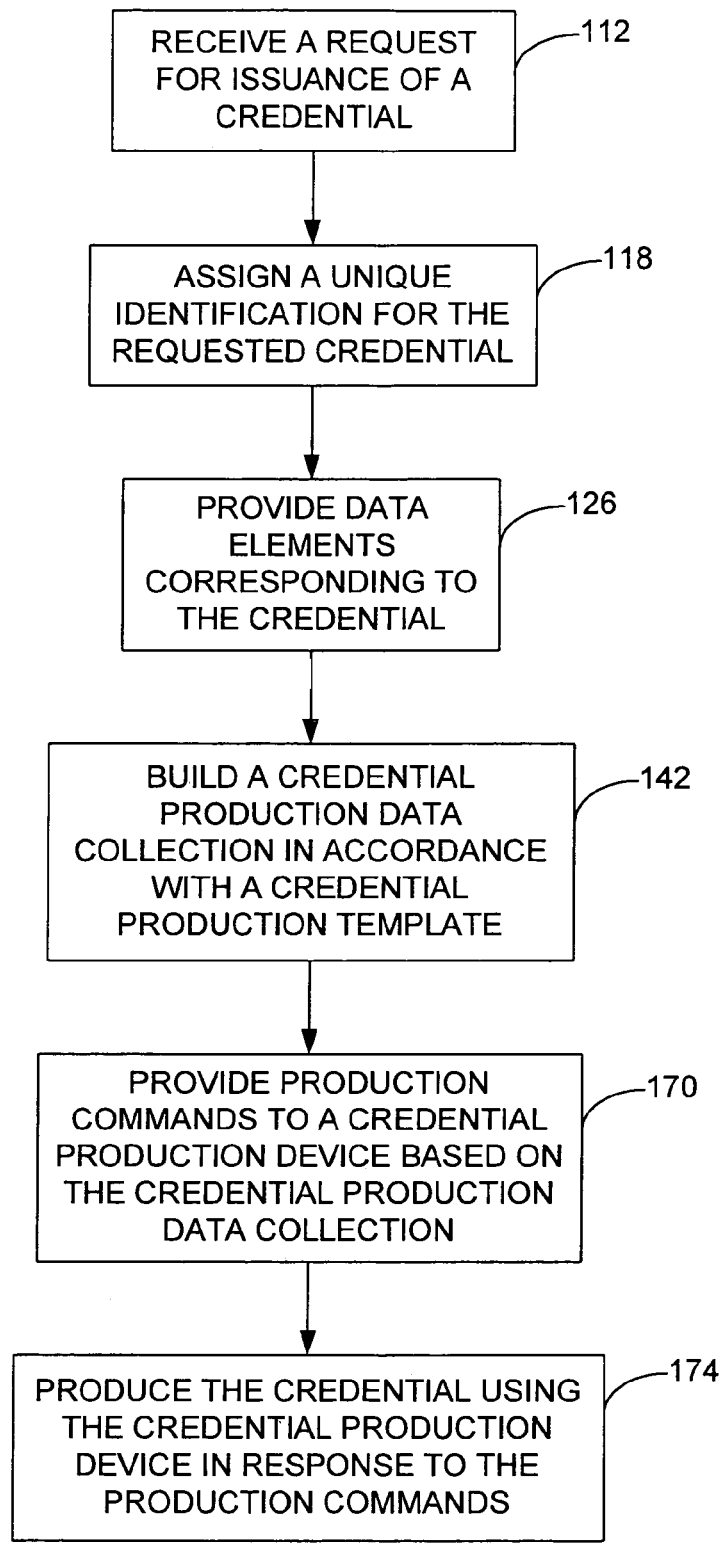
FIG. 1 is a flowchart illustrating a method of issuing a credential document in accordance with embodiments of the invention.
Figure 2:
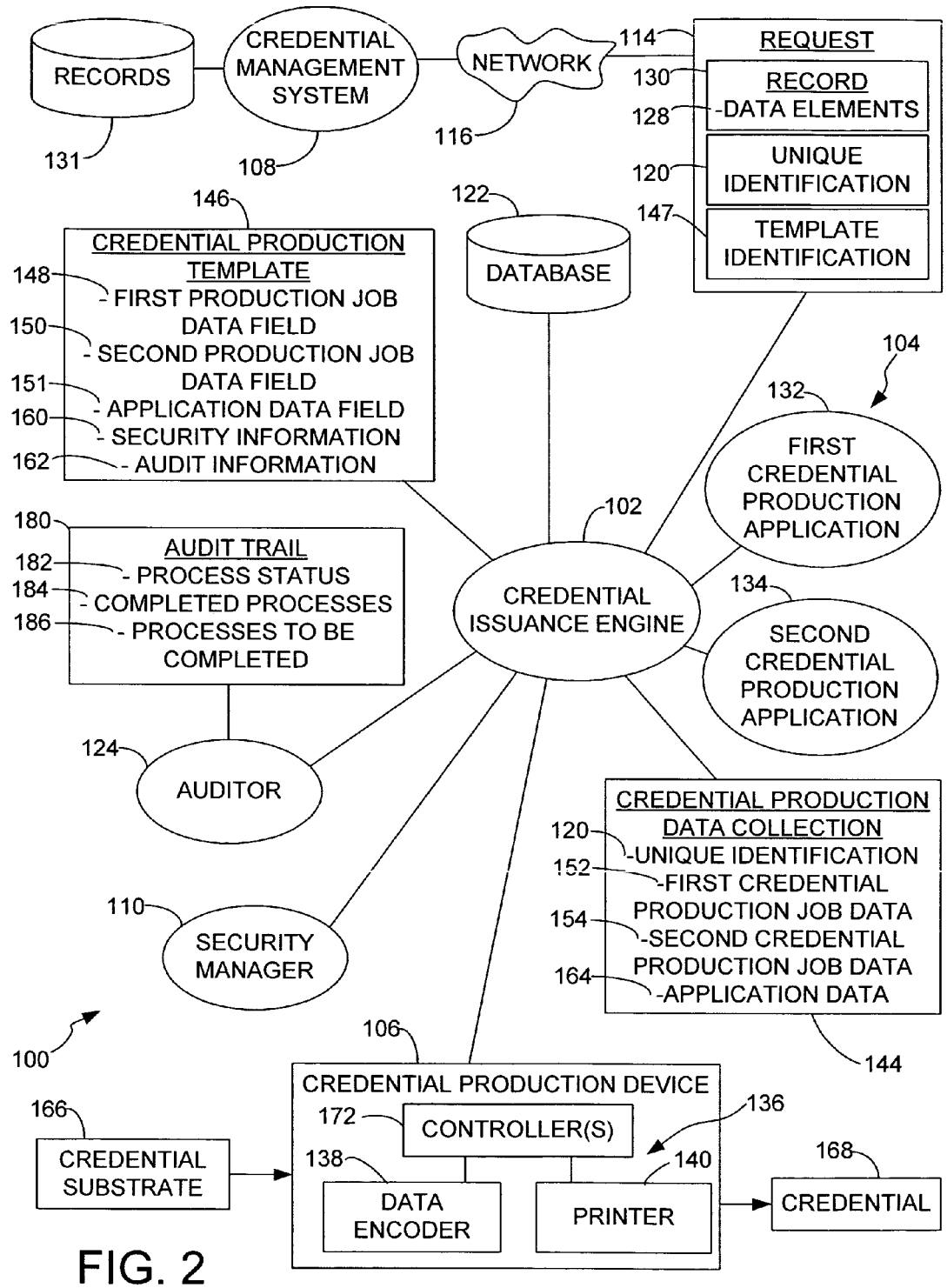
FIG. 2 is a block diagram of a credential issuance system in accordance with embodiments of the invention.

The present invention generally relates to credential issuance and will be described with reference to FIGS. 1 and 2. FIG. 1 is a flowchart illustrating a method of issuing a credential in accordance with embodiments of the invention. FIG. 2 is a block diagram of a credential issuance system in accordance with embodiments of the invention.

The credential issuance system 100 generally includes a credential issuance engine 102, one or more credential production applications 104, and one or more credential production devices 106. The credential issuance system 100 is generally remotely located from a credential management system 108 and operates independently from the credential management system. The credential management system 108 generally performs customer services for handling service requests regarding credentials including receiving orders for new credentials or replacement credentials from customers.

In accordance with one embodiment of the invention, communications between the credential issuance engine 102 and other components of the system 100 are performed in a secure manner. A security manager 110 can be used to facilitate the secure communications. The secure communication protocol that is used can vary depending on the desired level of security. In accordance with one embodiment of the invention, one or more security checks are made to verify that the parties of the communication (device, system or individual) are authorized parties. Such security checks can include, for example, password checks (e.g., Public Key Infrastructure or PKI, challenge-response protocol, etc.), biometric data checks, and other types of security checks. In accordance with one embodiment of the invention, the security manager 110 includes a hardware security module for securely storing encrypted keys that are used in accordance with the secure communication protocol. Additionally, the data sent during such communications can be encrypted in accordance with conventional methods to prevent misappropriation of the data.

At step 112 of the method, the credential issuance engine 102 receives a request 114 for issuance of a credential. Preferably, the request 114 and other related communications are made in a secure manner, as described above. In accordance with one embodiment of the invention, the request is communicated over a network 116 from the credential management system 108.

In accordance with one embodiment of the invention, a check is made to determine whether the issuance and/or production of the credential is authorized. Such an authorization check is not required in prior art systems that issue credentials locally. Authorization can be verified through a security check to determine whether the credential management system (or an operator of the system) 108 is a recognized authority for which the credential issuance system 100 is authorized to issue credentials and/or receive credential issuance requests. In accordance with one embodiment of the invention, the security check is handled by the security manager 110 and includes a password check, a biometric data check, or other suitable security check.

At step 118, a unique identification 120 is assigned to the requested credential. The unique identification can be provided along with the request 114 from the credential management system 108 (as shown), generated by the credential issuance engine 102, or retrieved from a database, such as database 122. The unique identification can be used to manage the issuance process. Additionally, the unique identification can be used as a reference by an auditor 124 that maintains an account of the issuance process.

At step 126, data elements 128 corresponding to the requested credential are provided to the credential issuance engine 102. In accordance with one embodiment of the invention, the data elements 128 are in an Extensible Markup Language (XML) format. The data elements 128 can be received by the credential issuance engine 102 in the form of a record 130 along with the request 114 from the credential management system 108 (as shown), obtained from the database 122, and/or retrieved from another location. Additionally, batch files containing multiple records and requests for credential issuance can be provided to the credential issuance engine 102 from a records database 131. Preferably, the data elements are provided in a secure manner, as described above.

The data elements 128 generally include data to be used to form the requested credential such as image data corresponding to an image to be printed to the credential and encoding data to be encoded to the credential (i.e., written to a smartcard chip, a magnetic stripe, a barcode, etc.). Additionally, the data elements can include application data for use by one or more credential production applications 104, such as first credential production application 132 and second credential production application 134. The credential production applications 104 are generally configured to process the application data and produce production job data used to control one or more credential process devices 136 of the credential production device that produce the requested credential. For example, a smartcard chip encoding production application can process the data elements into instructions for a data encoder 138 to encode data to the credential or a printing device 140 for printing an image to the credential.

The data elements 128 can be tied to the unique identification 120. For instance, the unique identification 120 can be used to identify the intended credential holder through a look-up table or other method. Accordingly, data elements corresponding to personal information of the credential holder and features that are to be included in the credential can then be obtained using the unique identification from, for example, the database 122.

At step 142 of the method, a credential production data collection 144 is built by the credential issuance engine 102 in accordance with a credential production template 146. The credential production template 146 can be received from the credential management system 108. In accordance with one embodiment of the invention, the requested credential is associated with the credential production template 146. For example, a template identification 147 in the request 114 can identify the template 146 to be used for the requested credential and the credential issuance engine 102 can access the identified template 146 in the database 122, or other location. Alternatively, the credential issuance engine 102 can select a template 146 based on the type of credential being issued, the credential management system 108 making the request, or other basis.

One embodiment of the credential production template 146 defines features of the requested credential. For example, the credential production template 146 can include one or more production job data fields such as first and second production job data fields 148 and 150, each of which correspond to a different feature of the requested credential (i.e., data encoding, printing, etc.). An application data field 151 defines the application data (i.e., smartcard application data) to be written to the credential. Additionally, the credential production template 146 can define a format for the data fields.

The credential issuance engine 102 provides select data elements 128 to the credential production applications 104 as required to complete the fields of the credential production template 146 and form the credential production data collection 144. For example, image-related data elements 128 can be processed by the first credential production application 132 to produce first credential production job data 152 relating to instructions to the credential production device 106 to print an image to the credential substrate. Similarly, data elements 128 corresponding to data to be encoded to the credential can be provided to the second credential production application 134 to produce second credential production job data 154 relating to instructions to the credential production device to encode data to the credential.

Additionally, the credential issuance engine can move select data elements that do not require processing to complete fields of the credential production template, such as application data 164, to be written to a smart card chip of the credential. One embodiment of the credential production template includes location identifiers (i.e., pointers) of the data elements that are required to produce the credential. These can be the same as the data elements 128 discussed above, or relate to different data.

Another embodiment of the credential production template 146 includes security information 160 such as a level of security required to issue or produce the credential, authorities required to issue or produce the credential, and encryption that is required of the data, for example. The credential production template 146 can also include audit information 162 defining the auditing to be performed during the issuance or production of the credential.

The credential production data collection 144 is complete when all of the fields of the credential production template 146, or at least those designated as being required, have been filled. Thus, embodiments of the credential production data collection 144 include the unique identification 120 for the requested credential, application data 164 corresponding to one or more applications to be written to a smartcard chip of the credential, and credential production job data, such as 152 and 154, corresponding to one or more processes (i.e., printing of an image, encoding of data, laminating, etc.) to be performed on a credential substrate 166 (e.g., card substrate for identification cards, page substrates of a passport, a hologram overlaminate, etc.) to form the credential 168.

In accordance with one embodiment of the invention, the credential production data collection 144 is written in Extensible Markup Language (XML) format. Thus, each data element of the collection 144 is preferably encapsulated by tags that identify the encapsulated data. Thus, for example, the credential production data collection 144 can include a data string in the form of "<UID> unique identification </UID><FIRST JOB>first production job data</FIRST JOB><SECOND JOB>second production job data</SECOND JOB><IMAGE>image data</IMAGE><FIRST APPLICATION>first application data</FIRST APPLICATION> . . . " where the tags (the text within the brackets) identify and encapsulate the data therebetween. For example, the tags "<UID>" and "</UID>" encapsulate the unique identification data.

At step 170, production commands are provided to the credential production device 106 by the credential issuance engine 102 based on the credential production data collection. The credential production device includes one or more controllers 172 that respond to the commands by processing the credential substrate 166 to produce the credential 168, at step 174.

The production commands are preferably communicated to a controller of the credential production device in accordance with a secure communication protocol, as described above. In accordance with one embodiment of the invention, the credential issuance engine 102 verifies that the credential production device 106 is authorized to produce the credential prior to providing the production commands. For example, the security manager 110 can perform a security check of the credential production device 106 including a security check to determine whether components of the device 106 are authorized production components.

The production commands are preferably formatted in accordance with a device definition for the credential production device 106 or definitions for the process devices 136 of the credential production device 106. The definitions can be included in the credential production template 146, retrieved from the database 122, or provided to the credential issuance engine 102 from the credential production device 106.

The credential issuance engine 102 sequences the commands in accordance with the definition(s) and selectively feeds the commands to the credential production device 106 to process the credential substrate 166 and form the credential 168 in accordance with the request 114. For instance, the commands can include commands for controlling the feeding of the credential substrate 166 through the credential production device 106, commands for printing an image to the credential substrate 166 by a printing device 140 and commands for encoding data to the credential substrate 166 by a data encoding device 138.

In accordance with one embodiment of the invention, the credential issuance engine 102 includes an XML parser that directs each data portion of the credential production data collection to the appropriate processing device 136 of the credential production device 106 based on the XML tags. For example, when the credential issuance engine 102 receives the exemplary XML credential production data collection provided above, the credential issuance engine 102 identifies the first credential production job data by the tag <FIRST JOB> and provides the corresponding commands to the process device 136 configured to perform the corresponding job. Alternatively, the controller 172 can include the XML parser.

In accordance with one embodiment of the invention, the selective feeding of the commands is performed in response to a communication from the credential production device 106 or the individual processing devices 136. Thus, the credential issuance engine 102 monitors the processing steps that produce the credential 168. The credential issuance engine 102 preferably receives a communication from the credential production device 106 indicating that a process step has been completed before sending commands for performing the next process step. For example, production commands to print an image to the credential substrate 166 may follow a communication from the credential production device 106 indicating that the credential substrate 166 is in position to begin printing. The credential issuance engine 102 then monitors the printing of the image and sends the commands for the next processing steps (e.g., substrate feeding, data encoding, etc.) to the credential production device 106 once the printing is complete. This process continues until the production of the credential 168 is complete. In accordance with one embodiment of the invention, the communication from the credential production device 106 notifying the credential issuance engine 102 of a completed process step includes the unique identification 120.

The auditor 124 of the credential issuance system 100 can maintain an audit trail 180 for the issuance of the credential. As mentioned above, the auditor 124 uses the unique identification 114 as a reference. In general, the audit trail 180 includes a status 182 of the processing of the credential.

The audit trail 180 can also include information on completed processing steps 184, such as, for example, time and date information regarding completed processing steps, information about the credential production device 106 or process device 136 that performed the process step, an identification of an operator of the credential production device 106 that performed the process step, and other information. The audit trail 180 can also include a list of processing steps yet to be completed 186 before production of the credential is complete. Information regarding the processing steps to be completed can be obtained from the credential production template 144.

The auditor 124 can also be configured to identify unusual credential production activity that may indicate a security problem, or a problem with the credential production device that may indicate that servicing of the device is required.

When the production of the credential 168 is complete, the credential issuance engine 102 notifies the auditor 124, which updates the process status 182 of the audit trail 180 for the credential. Preferably communications between the auditor 124 and the credential issuance engine 102 are performed in a secure manner, as describe above.

Following the production of the credential 168, the credential 168 can be issued to the intended credential holder. Activation of the credential 168 may be required, which can be performed by the credential management system 108.

Although the present invention has been described with reference to preferred embodiments, workers skilled in the art will recognize that changes may be made in form and detail without departing from the spirit and scope of the invention.

What is claimed is:

1. A method of issuing a credential document comprising steps of:
   receiving a request for issuance of a credential;
   assigning a unique identification for the requested credential;
   providing data elements corresponding to the credential;
   processing the data elements using a first credential production application to produce first production job data;
   processing the data elements using a second credential production application to produce second production job data;
   building a credential production data collection in accordance with a credential production template, the credential production data comprising a string of data including the unique identification, the first production job data and the second production job data;
   providing production commands to a first credential production device based on the first production job data and to a second credential production device based on the second production job data; and
   processing a credential substrate using the first and second credential production devices in response to the production commands to produce the credential.

2. The method of claim 1 including generating the unique identification.

3. The method of claim 1, including conducting the receiving step in accordance with a secure communication protocol including performing a security check.

4. The method of claim 3, wherein the security check is selected from a group consisting of a password check and a biometric data check.

5. The method of claim 1, wherein the building step includes completing a plurality of credential application production data fields of the template.

6. The method of claim 1 including associating the request to the credential production template.

7. The method of claim 1, wherein:
the first credential production device includes a printer; and
the step of processing a credential substrate comprises printing an image on the credential substrate using the printer based on the first production job data.

8. The method of claim 7, wherein:
the second credential production device includes a data encoder; and
the step of processing the credential substrate comprises encoding data to the credential substrate using the data encoder based on the second production job data.

9. The method of claim 1, wherein the production commands are selectively fed to the first and second credential production devices in the steps of providing step production commands.

10. The method of claim 1, wherein the steps of providing production commands includes verifying that the first and second credential production devices are authorized to receive the production commands.

11. The method of claim 1, including maintaining an audit trail of the production of the credential including, the unique identification, and production information selected from the group consisting of an identification of a last completed production step, an identification of an authority who authorized production of the credential, and an indication of whether the credential was processed completely.

12. The method of claim 1 including verifying that the production of the credential is authorized prior to the step of processing a credential substrate.

13. A method of issuing a credential comprising:
building a credential production data collection comprising a unique identification, first production job data generated by a first credential production application and second production job data generated by a second credential production application, the first and second production job data each relating to a feature of the credential;
providing production commands to a first credential production device based on the first production job data
providing production commands to a second credential production device based on the second production job data; and
producing the credential using a credential substrate and the first and second credential production devices in response to the production commands.

14. The method of claim 13, wherein the first credential production device includes a printer and the second production device includes a data encoder, the first production job data corresponds to instructions for printing an image on the credential substrate with the printer, and the second production job data corresponds to instructions for encoding data to the credential substrate with the encoder.

15. The method of claim 13, wherein the credential production data collection is built in accordance with a credential production template.

16. The method of claim 13, including maintaining an audit trail of the production of the credential including, the unique identification, and production information selected from the group consisting of an identification of a last completed production step, an identification of an authority who authorized production of the credential, and an indication of whether the credential was processed completely.

* * * * *